(12) United States Patent
Luiz et al.

(10) Patent No.: US 9,448,837 B2
(45) Date of Patent: Sep. 20, 2016

(54) COOPERATIVE THREAD ARRAY GRANULARITY CONTEXT SWITCH DURING TRAP HANDLING

(71) Applicant: NVIDIA CORPORATION, Santa Clara, CA (US)

(72) Inventors: Gerald F. Luiz, Los Gatos, CA (US); Philip Alexander Cuadra, San Francisco, CA (US); Luke Durant, Santa Clara, CA (US); Shirish Gadre, Fremont, CA (US); Robert Ohannessian, Austin, TX (US); Lacky V. Shah, Los Altos Hills, CA (US); Nicholas Wang, Saratoga, CA (US); Arthur Merlin Danskin, Los Angeles, CA (US)

(73) Assignee: NVIDIA Corporation, Santa Clara, CA (US)

(*) Notice: Subject to any disclaimer, the term of this patent is extended or adjusted under 35 U.S.C. 154(b) by 536 days.

(21) Appl. No.: 13/863,286

(22) Filed: Apr. 15, 2013

(65) Prior Publication Data

US 2014/0189711 A1 Jul. 3, 2014

Related U.S. Application Data

(63) Continuation-in-part of application No. 13/728,784, filed on Dec. 27, 2012.

(51) Int. Cl.
*G06F 9/00* (2006.01)
*G06F 9/44* (2006.01)
*G06F 13/00* (2006.01)
*G06F 9/48* (2006.01)
*G06F 9/46* (2006.01)

(52) U.S. Cl.
CPC ............. *G06F 9/4812* (2013.01); *G06F 9/461* (2013.01)

(58) Field of Classification Search
None
See application file for complete search history.

(56) References Cited

U.S. PATENT DOCUMENTS

| 6,128,641 | A | 10/2000 | Fleck et al. | |
|---|---|---|---|---|
| 6,629,252 | B1 | 9/2003 | Gholami et al. | |
| 7,861,060 | B1 | 12/2010 | Nickolls et al. | |
| 2004/0143714 | A1* | 7/2004 | Watt | G06F 12/1491 711/163 |
| 2004/0187117 | A1* | 9/2004 | Orion | G06F 9/4812 718/100 |
| 2007/0043531 | A1* | 2/2007 | Kosche | G06F 11/3447 702/182 |
| 2011/0078427 | A1* | 3/2011 | Shebanow | G06F 9/327 712/244 |
| 2013/0117760 | A1* | 5/2013 | Cuadra | G06F 9/3861 718/108 |
| 2013/0318277 | A1* | 11/2013 | Dalal | G06F 13/1605 710/308 |

* cited by examiner

*Primary Examiner* — Michael Sun
(74) *Attorney, Agent, or Firm* — Artegis Law Group, LLP

(57) ABSTRACT

Techniques are provided for restoring thread groups in a cooperative thread array (CTA) within a processing core. Each thread group in the CTA is launched to execute a context restore routine. Each thread group, executes the context restore routine to restore from a memory a first portion of context associated with the thread group, and determines whether the thread group completed an assigned function prior to executing the context restore routine. If the thread group completed an assigned function prior to executing the context restore routine, then the thread group exits the context restore routine. If the thread group did not complete the assigned function prior to executing the context restore routine, then the thread group executes one or more operations associated with a trap handler routine. One advantage of the disclosed techniques is that the trap handling routine operates efficiently in parallel processors.

21 Claims, 12 Drawing Sheets

COOPERATIVE THREAD ARRAY GRANULARITY CONTEXT SWITCH DURING TRAP HANDLING

CROSS-REFERENCE TO RELATED APPLICATIONS

This application is a continuation of the co-pending U.S. patent application having Ser. No. 13/728,784, filed Dec. 27, 2012, entitled "COOPERATIVE THREAD ARRAY GRANULARITY CONTEXT SWITCH DURING TRAP HANDLING," which is hereby incorporated herein by reference.

BACKGROUND OF THE INVENTION

1. Field of the Invention

The present invention generally relates to parallel processor architectures and, more specifically, to cooperative thread array granularity context switch during trap handling.

2. Description of the Related Art

In computer architecture, a trapping instruction is a type of instruction that interrupts a currently running program. Interruptions of a program may occur for various reasons. Examples of ordinary trap occurrences could include a system call for more information, or a pause in which the computer is instructed to wait for user input (e.g., pressing a key on a keyboard). Examples of trap occurrences in response to an error could include attempts to perform an illegal computer operation, such as dividing by zero, or accessing an invalid memory location. In addition, trapping instructions may be manually inserted by a programmer for debugging purposes.

When a trapping instruction is encountered, a dedicated program known as a trap handling routine is executed, (e.g., by causing the program counter to point to a trap handling routine, also known as a trap handler). A context switch is typically performed when executing a trap handling routine. In general, context switching describes the computing process of storing and restoring the state of a processing unit so that execution of the running program can be resumed from the point of interruption at a later time. Typically, context switching is computationally expensive.

In a parallel processing system, in which multiple threads are processed simultaneously across different execution units as a single logical unit, known as a cooperative thread array, a trap encountered in a single thread (hereinafter referred to as a "trapping thread") causes a context switch of all executing threads. Such an occurrence is not desirable because context switches in executing threads other than that of the trapping thread cause computer resources to be consumed unnecessarily and a slowdown in execution of non-trapping threads.

Accordingly, what is needed in the art is a trap handling routine that operates efficiently in parallel processors.

SUMMARY OF THE INVENTION

Embodiments of the present invention set forth a method for restoring thread groups in a cooperative thread array (CTA) within a processing core. The method includes launching each thread group included in a plurality of thread groups within the processing core to execute a context restore routine. The method further includes, for each thread group included in a plurality of thread groups, executing the context restore routine to restore from a memory a first portion of a context associated with the thread group, and determining whether the thread group completed an assigned function prior to executing the context restore routine. If the thread group completed an assigned function prior to executing the context restore routine, then the method further includes exiting the context restore routine. If the thread group did not complete the assigned function prior to executing the context restore routine, then the method further includes executing one or more operations associated with a trap handler routine.

Other embodiments include, without limitation, a computer-readable medium that includes instructions that enable a processing unit to implement one or more aspects of the disclosed methods as well as a system configured to implement one or more aspects of the disclosed methods.

One advantage of the disclosed techniques is that the trap handling routine operates efficiently in parallel processors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
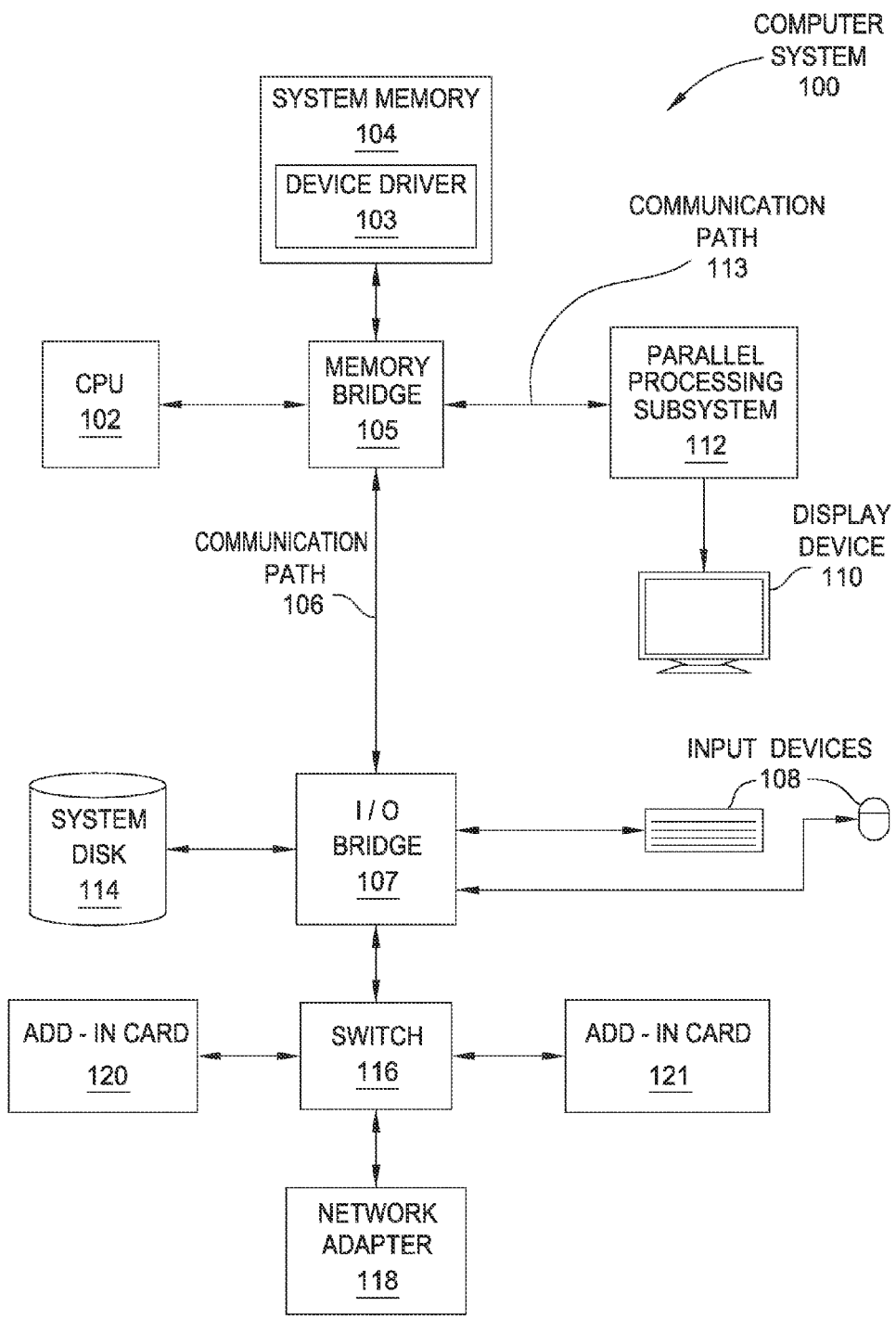
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
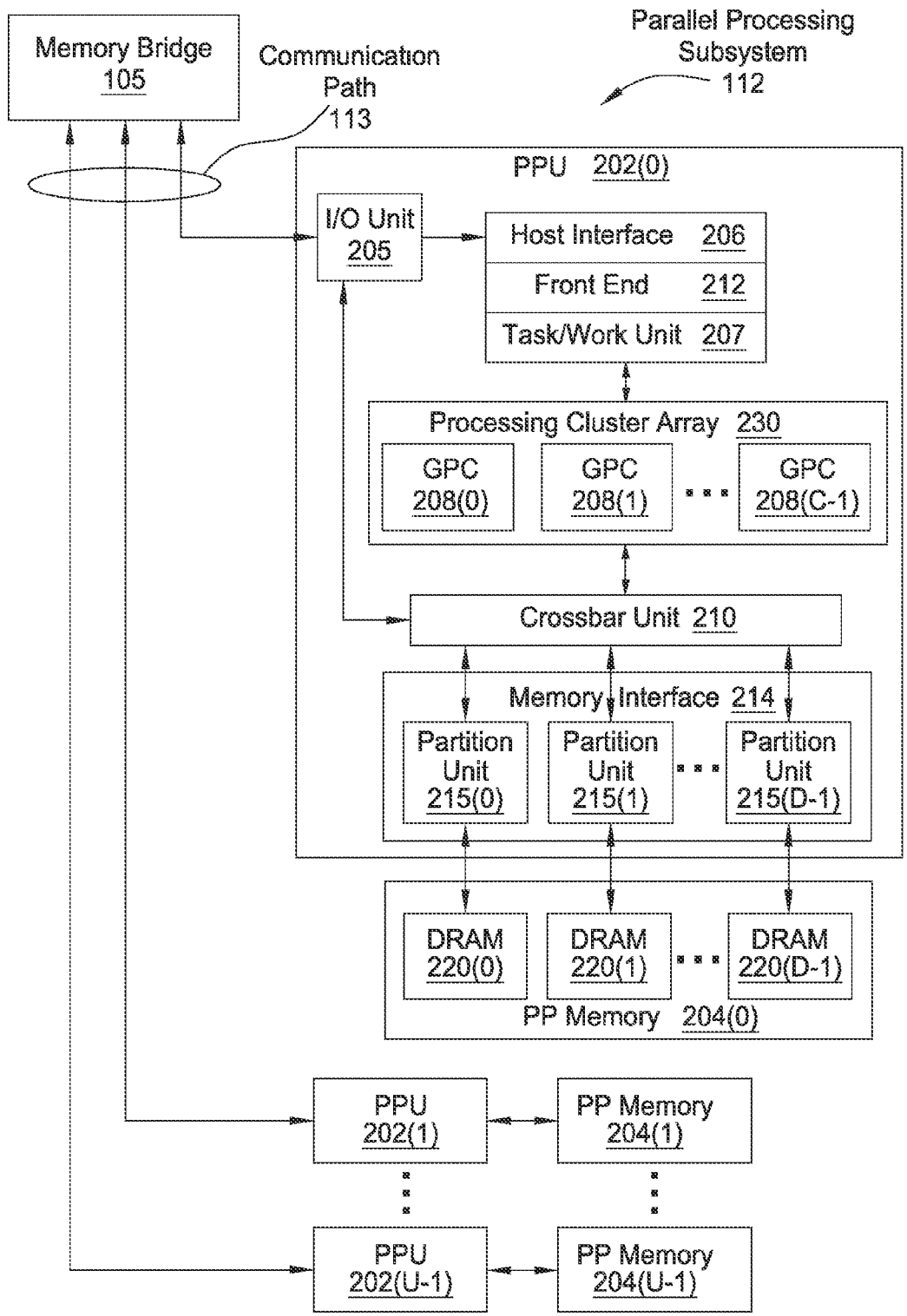
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks could be directed to a host interface 206, while commands related to memory operations (e.g., reading from or writing to parallel processing memory 204) could be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata TMDs (not shown) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/ work unit 207 receives the tasks and dynamically schedules the processing tasks and child processing tasks for execution by the GPCs 208.

Figure 3:
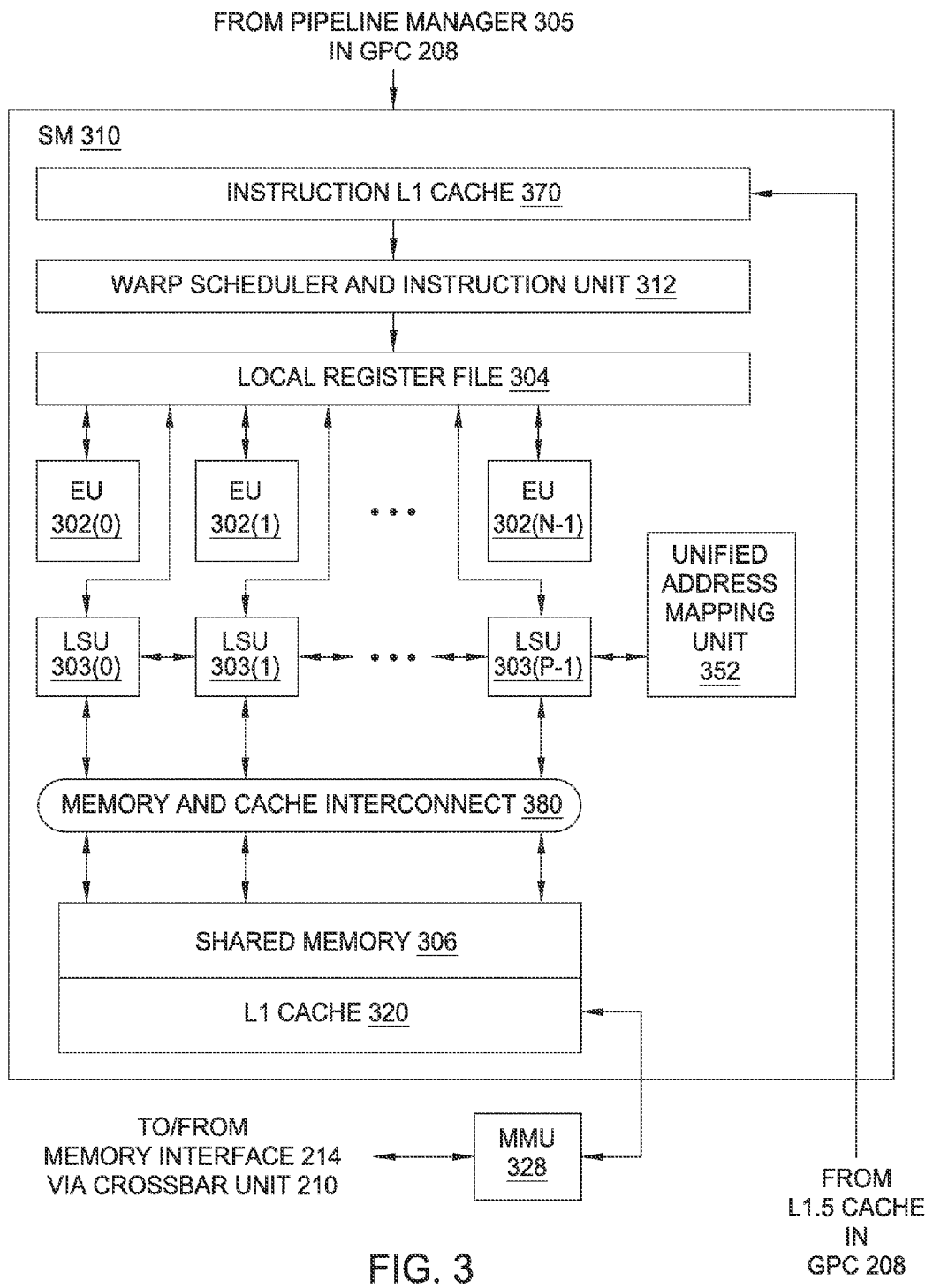
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N execution (execution or processing) units (EUs) 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions could include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD 322. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD 322, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Cooperative Thread Array Granularity Context Switch During Trap Handling

Figure 4:
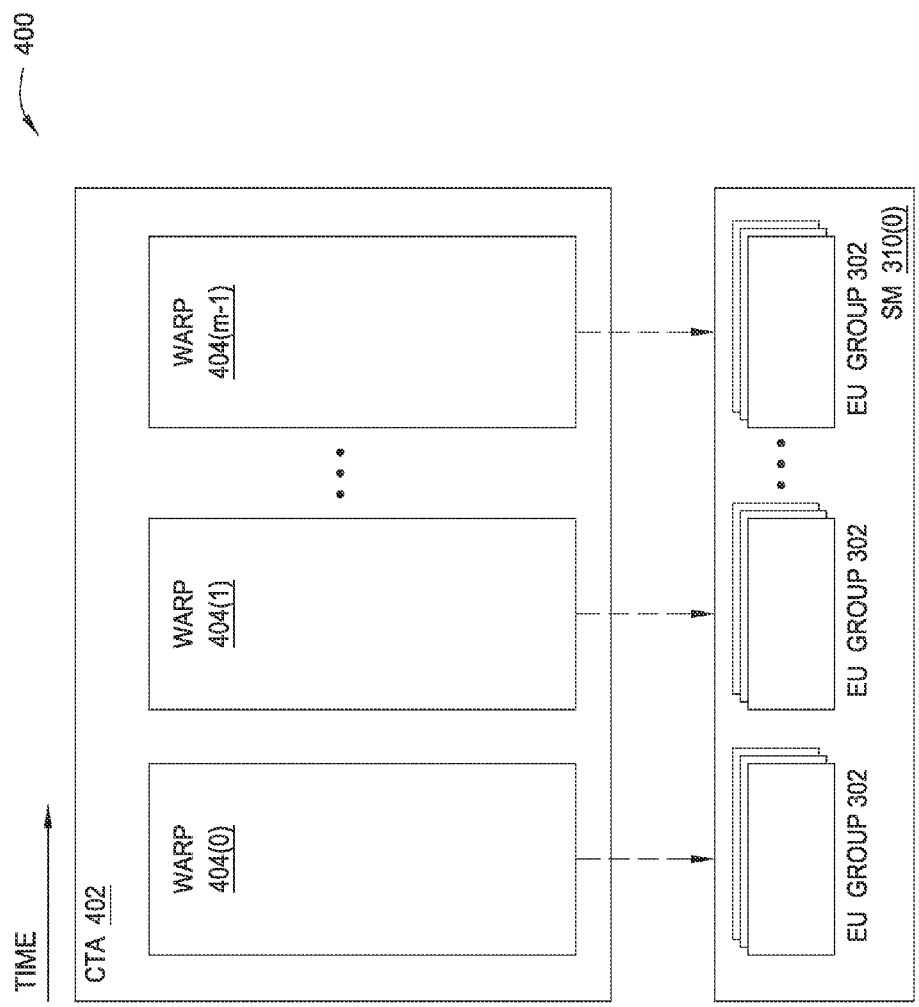
FIG. 4 is a block diagram illustrating a series of warps in a cooperative thread array (CTA) executing in a streaming multiprocessor, according to one embodiment of the present invention.

FIG. 4 is a block diagram illustrating a series of warps 404 in a cooperative thread array (CTA) 402 executing in a streaming multiprocessor 310(0), according to one embodiment of the present invention. The SM 310(0) includes execution unit (EU) group 302, which includes N execution units (EUs) 302(0)-302(N-1), as shown in FIG. 3. CTA 402 includes m warps, shown as warps 404(0)-404($m$-1). A group of concurrently executing threads within the SM 310(0) constitutes a warp 404, where each thread in a warp 404 executes the same program instructions on different input data. Each thread in a given warp 404 executes on a different EU 302(0)-302(N-1) in the EU group 302. As warp 404(0) progresses over time through the pipeline of the EU group 302, warp 404(1) may enter the pipeline of the EU group 302, such that warp 404(0) and warp 404(1) execute concurrently, but in different stages of the pipeline. Likewise, as warps 404(0) 404(1) progress through the pipeline of the EU group 302, additional warps may enter the pipeline and execute concurrently with warps 404(0) 404(1).

As shown, warps 404 are illustrated such that warps 404 are executed from the bottom up. Accordingly, an instruction (not shown) located on the bottom of warp 404 executes earlier than an instruction on the top of warp 404. In some embodiments, the EU group 302 may execute warps 404 from CTA 402 concurrently with warps from other CTAs (not shown). In various embodiments, each warp may identifies a corresponding CTA to which the warp belongs either explicitly via a CTA-level identifier that is accessible to the warp, implicitly via a thread identifier or warp identifier that uniquely identifies the CTA, or via any other technically feasible approach.

Figure 5:
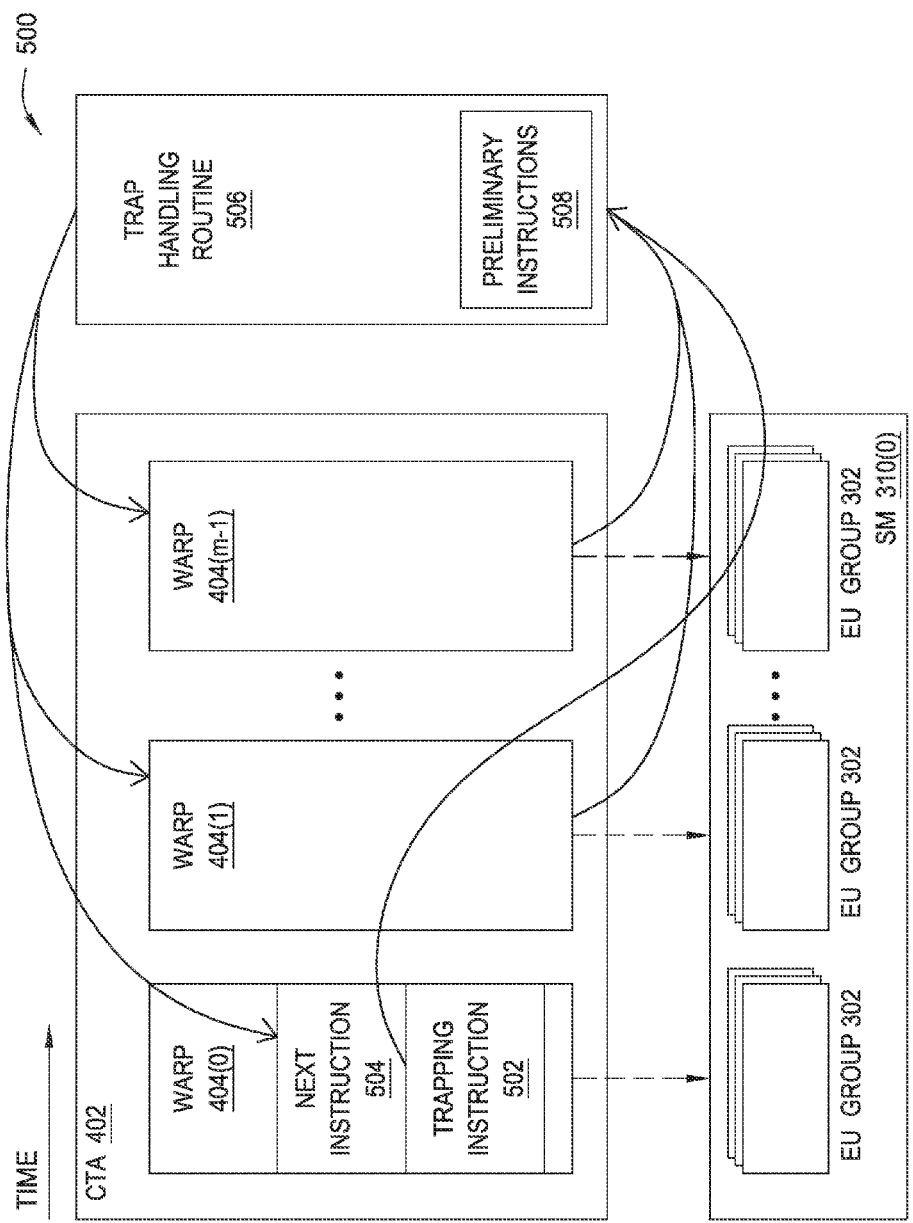
FIG. 5 is a block diagram illustrating a series of warps in a cooperative thread array (CTA) executing in a streaming multiprocessor, according to another embodiment of the present invention.

FIG. 5 is a block diagram illustrating a series of warps 404 in a cooperative thread array (CTA) 402 executing in a streaming multiprocessor 310(0), according to another embodiment of the present invention. The SM 310(0) and the CTA 402 function substantially similar to the SM 310(0) and the CTA 402 of FIG. 4, except as further described below.

As shown, warp 404(0) executes a trapping instruction 502, causing all warps 404(0)-404($m$-1) to enter trap handling routine 506. Prior to entering the trap handling routine 506, the trapping warp 404(0) updates a warp-specific entry in a trap reason table (TRT) to pass data to the trap handling routine 506, as further described below in conjunction with FIG. 6A. In some embodiments, the warp that 404(0) executes the trapping instruction 502 may execute preliminary instructions 508 upon entering the trap handling routine 506, and may then execute the remainder of the trap handling routine 506. The warps 404(1)-404($m$-1) that did not execute the trapping instruction 502 may execute the trap handling routine 506, but not the preliminary instructions 508. Upon completing execution of the trap handling routine 506, the warp 404(0) exits the trap handling routine 506 and is then ready to exit from the SM 310(0). Other warps 404(1)-404($m$-1) in CTA 402 also complete execution of the trap handling routine 506 and exit the trap handling routine 506. In some embodiments, warps executing on SM 310(0) that are associated with CTAs (not shown) other than CTA 402 may also enter the trap handling routine 506. Upon entering the trap handling routine 506, such warps may determine that the warp that executed the trapping instruction is associated with a different CTA 402. Accordingly, such warps may quickly exit the trap handling routine 506 prior to executing the main body of instructions in the trap handling routine 506.

Traps are encountered in a number of scenarios. As described above, a trap may result when execution of an instruction causes an exception, such as an attempt to divide by zero or an invalid memory access. Another example of a trap occurs when a breakpoint instruction is executed. As used herein, a warp that causes a trap to occur is referred to as having "trapped." Furthermore, a warp that contains a trap is referred to as a "trapping warp." Finally, since warp 404(0) contains trapping instruction 502, warp 404(0) is referred to herein as trapping warp 404(0).

During trap handling, any of the warps 404(1)-404($m$-1) may perform a context switch after preliminary instructions 508 are executed. In general, context switching is the process of storing and restoring the state (herein referred to as context data, or context) of a processing unit so that execution can be resumed from the same point at a later time. The process of storing and restoring the state is called a context save operation and a context restore operation, respectively. In one embodiment, a context save as applied to the execution of the trap handling routine 506 may involve, without limitation, halting execution of warp 404 by EU group 302, and storing of the context in a backup storage memory (not shown) for later recovery. Context saved during a context switch includes the contents of various storage elements associated with the warp 404 undergoing the context switch, including, without limitation, the current stack, local registers, local memory, and shared memory related to the currently running warp 404.

After the trap handling routine 506 finishes storing the context to the backup storage memory, the trap handling routine 506 passes control to a user save routine (not shown). The user save routine includes instructions that save additional context to the backup storage memory that is not saved as part of the trap handling routine 506. As such, the trap handling routine saves context that is common to most or all warps, while the user save routine saves context that is specific to the particular warp 404 whose context is being saved. Before exiting the user save routine, the warp 404 informs other executing CTAs that the context for the current warp 404 is saved to memory and that the warp 404 can be restored when the conditions causing the trap have been resolved. Once the context for each warp 404(0)-404($m$-1) in CTA 402 is stored and all warps 404(0)-404($m$-1) in CTA 402 have exited the trap handling routine 506, the CTA 402 may then be removed, or "retired," from active execution in the SM 310(0). Removing the CTA 402 from active execution frees resources in the SM 310(0) to process warps for other CTAs.

Once the conditions causing the trap have been resolved, the CTA 402 is restored. The CTA 402 is placed in the grid in the same grid position the CTA 402 occupied prior to being retired. Each warp 404(0)-404($m$-1) in the CTA 402 then executes a user restore routine (not shown). During execution of the user restore routine, the warp 404 first determines whether the warp 404 completed execution prior to the context save. If the warp 404 completed execution prior to the context save, then there is no need to restore the warp 404. Such a warp 404 exits the user restore routine and terminates. Otherwise, the warp 404 performs a context restore operation. The warp 404 locates the backup storage memory that includes the previously stored context. The warp 404 then restores the warp-specific context from the backup storage memory. The warp 404 updates a warp-specific entry in the TRT to include an indication that the warp 404 is being restored and a pointer to the location of the backup storage memory. The warp 404 then executes a trapping instruction to pass control to the trap handling routine 506.

In some embodiments, the warp that 404(0) originally executed the trapping instruction 502 may execute preliminary instructions 508 upon entering the trap handling routine 506, and may then execute the remainder of the trap handling routine 506. The warps 404(1)-404(m−1) that did not execute the trapping instruction 502 may execute the trap handling routine 506, but not the preliminary instructions 508. During execution of the trap handling routine 506, the warp 404 determines that a context restore operation is in progress. As part of the context restore operation, the warp 404 locates the backup storage memory that includes the context, and restores the context from the backup storage memory to the appropriate memory and register locations. The restored context includes the contents of various storage elements associated with the warp 404, including, without limitation, the previously stored stack, local registers, local memory, and shared memory related to the restored warp 404. The warp 404 then executes a return from trap (RTT) instruction, causing the warp 404 to exit the trap handling routine 506. The RTT instruction pops the program counter from the stack, causing the warp 404 to begin execution at the next instruction 504. For the trapping warp 404(0), the next instruction 504 is the instruction immediately following the trapping instruction 502 that caused the original trap. Non-trapping warps 404 resume execution at the instruction that was executing at the time of the original trap.

In some embodiments, some context may not be directly available for copying into the backup storage memory. In one example, the warp 404 could include the state of a CTA-wide synchronization mechanism known as an execution barrier. Barriers allow execution of the warps 404 in the CTA 402 to all stop execution at a particular point, and wait for all warps 404 to reach the barrier. The warps 404 resume execution once all warps 404 reach the execution barrier. During context save, the warp 404 could execute a special "save barriers" instruction to transfer the state of the barriers to a general purpose register. Once the barrier state is transferred to the general purpose register, the warp 404 could then copy the barrier state to the backup storage memory. During the context restore operation, the warp 404 would copy the barrier state from the backup storage memory to a general purpose register. The warp 404 would then execute a special "restore barriers" instruction to transfer the contents of the general purpose register to the barrier state.

In another example, each warp 404 could be associated with a hardware managed stack, known as a call/return stack or CRS, where the CRS includes call/return tokens to facilitate the management of control flow operations. During context save, the warp 404 could execute a special "get CRS pointer" instruction to transfer the state of the CRS pointer and other CRS-related metadata to a general purpose register. Once the CRS pointer and metadata are transferred to the general purpose register, the warp 404 could then copy the CRS pointer and metadata to the backup storage memory. During the context restore operation, the warp 404 would copy the CRS pointer and metadata from the backup storage memory to a general purpose register. The warp 404 would then execute a special "set CRS pointer" instruction to transfer the contents of the general purpose register to the CRS pointer and metadata.

In yet another example, the warps 404 could atomically access one or more locations of shared memory via shared memory lock bits. A warp 404 would attempt to acquire a lock when the warp 404 reads the location in shared memory. If the warp 404 successfully acquires the lock, then a corresponding lock bit would be set, confirming the lock. Otherwise, the lock bit would be reset, and the warp 404 would attempt to reacquire the lock. Once the warp 404 successfully acquires the lock, the warp 404 would then write to the shared memory and would release the lock. If a context switch occurs when one or more warps 404 have acquired a lock, then the trap handler 506 would execute a "global reset lock bits" instruction to reset all lock bits. After the context restore operation, all warps 404 that previously acquired a lock would determine that the corresponding lock bit is reset, and would reacquire a lock prior to writing to the shared memory.

In some embodiments, at least some of the context data in the backup storage memory may be restored without copying the actual data from the backup storage memory to the original location of the data. In such cases, the warp 404 may point to the data within the backup storage memory upon restore, rather than copying the data to local memory. If the warp 404 subsequently executes a second trapping instruction, then the trap handling routine 506 may determine that at least part of the context for the warp 404 is already in the backup storage memory and does not need to be copied from the local memory.

Figure 6A:
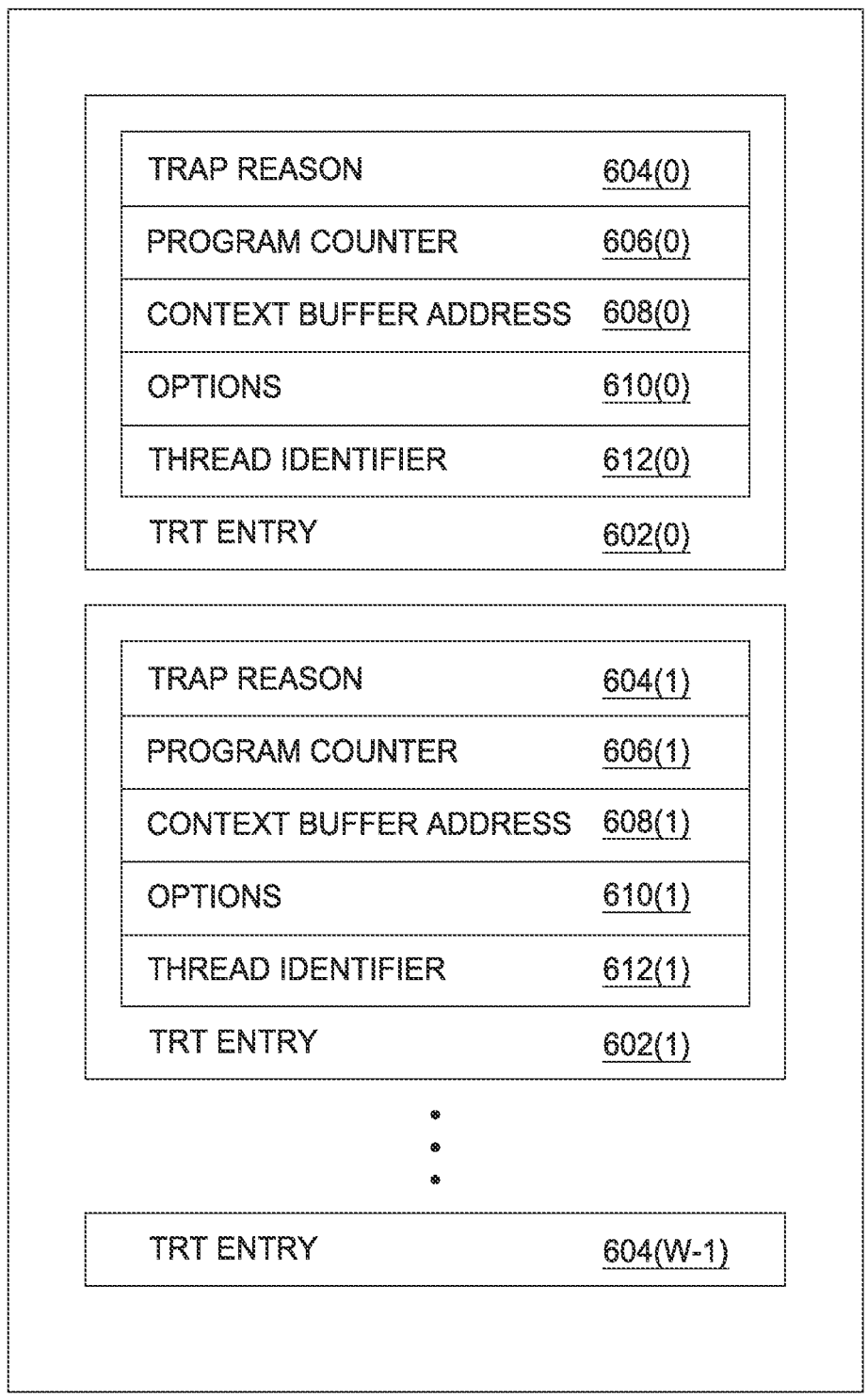
FIG. 6A is a block diagram illustrating a trap reason table (TRT), according to one embodiment of the present invention.

FIG. 6A is a block diagram illustrating a trap reason table (TRT) 600, according to one embodiment of the present invention. In various embodiments, the TRT 600 may be stored in a memory location that is accessible to each warp 404 in the CTA 402, including, without limitation, shared memory 306, PP memory 204, or system memory 104. As shown, the TRT 600 includes one TRT entry 602 for each warp 404, (e.g., TRT entries 602(0) through 602(W−1)), where W is the number of warps executing in SM 310(0). Each TRT entry 602 includes, without limitation, a trap reason 602, a program counter 606, a context buffer address 608, options 610 and a thread identifier 612. The process of writing to elements 604-612 for a given TRT entry 602 is referred to herein as a TRT entry update, or simply a TRT update.

The program counter 606 is used to store the location of a user-specified save routine. The user-specified save routine includes operations the SM 310 performs after a trap occurs but before the CTA 402 exits the trap handling routine 506. In some embodiments, the user-specified save routine associated with the program counter 606 may execute after the context is stored, as described above in conjunction with FIG. 5. The context buffer address 608 is used for, among other things, storing the location of a context buffer. The context buffer may be used to store data associated with the internal state of the SM 310 at the time of the context switch. Options 610 is used for, among other things, setting user options for each TRT entry 602. The thread identifier 612 is used to specify which warp 404 corresponds to a TRT entry 602. In various embodiments, the thread identifier 612 may be any per-warp or per-thread identifier that uniquely identifies the warp 404 corresponding to the TRT entry 602, including, without limitation, a physical thread identifier that identifies the portion of the PPU 112 where the warp 404 is executing, or a unique logical thread identifier.

Figure 6B:
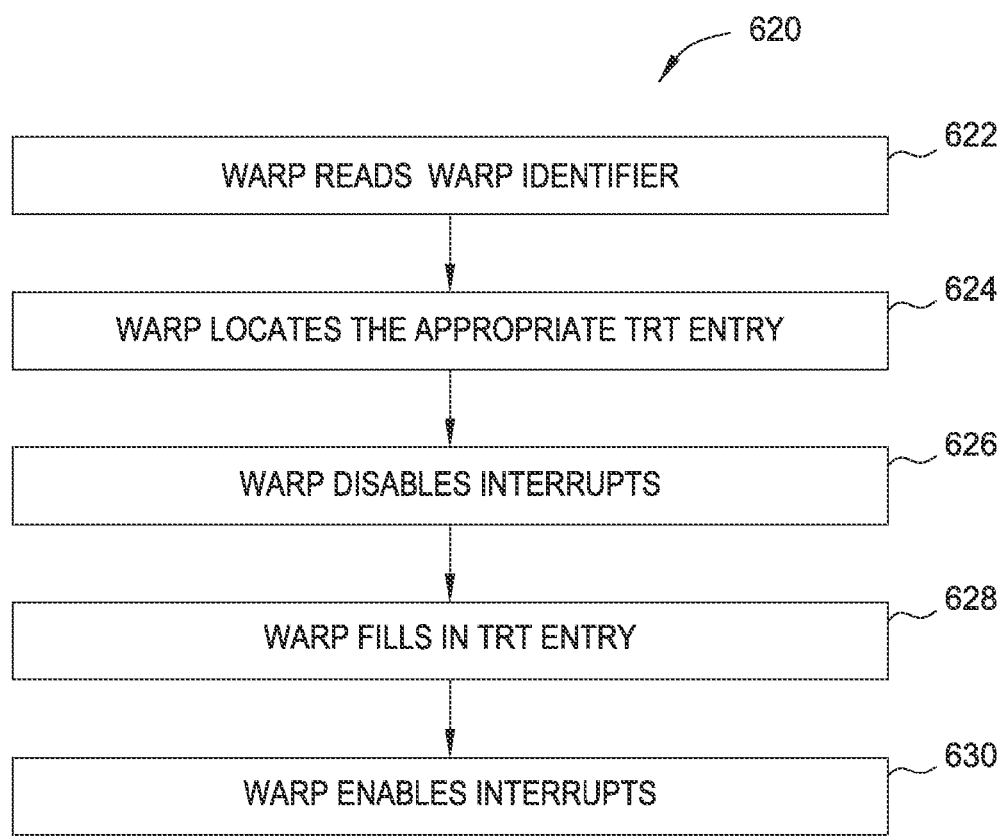
FIG. 6B sets forth a flow diagram of method steps depicting a process for executing a TRT entry update, according to one embodiment of the present invention.

FIG. 6B sets forth a flow diagram of method steps depicting a process for executing a TRT entry update, according to one embodiment of the present invention. Although the method steps are described in conjunction with the systems of FIGS. 1-5, persons skilled in the art will understand that any system configured to perform the method steps, in any order, is within the scope of the invention.

As shown, a method 620 begins at step 622, where, after a thread executes a trapping instruction, a warp 404 executes instructions causing a read of the thread identifier 612 associated with a trapping warp 404. At step 624, the warp 404 executes instructions causing a search for the appropriate TRT entry 602, based on thread identifier 612 associated with trapping warp 404(0). In one embodiment, at step 626, the warp 404 executes an IDE instruction and disables interrupts. At step 628, the warp 404 executes instructions causing writing of the data associated with trapping warp 404 into the parameters of TRT entry 602. TRT entry 602 parameters include, without limitation, trap reason 604, program counter 606, context buffer address 608, options 610 and thread identifier 612. In some embodiments, at step 630, EU 410 may execute an IDE instruction and may enable interrupts.

In one embodiment, an IDE instruction may allow for enabling and disabling of interrupts such as context switches, and may be useful when protecting critical sections of instructions against corruption. For example, a first TRT update could be interrupted in order to execute a second TRT update or context switch. This possibility raises a concern due to the fact that a TRT update could occur over multiple instruction cycles, and, if a TRT update is interrupted, then one or more elements 604-612 would only be partially updated. If a TRT entry 602 is only partially updated, then that TRT entry 602 may become corrupted. Thus, the process of updating TRT entry 602 may be considered a critical section of instructions within the trap handling routine that should not be interrupted.

In one embodiment, an IDE instruction may be used to cause the TRT entry update procedure to become non-interruptible, thus preventing a first TRT update from being interrupted by a second TRT update or context switch. An added benefit of an IDE instruction is that an IDE instruction may be used to protect other critical sections of code, such as instructions to release of resources after a CTA 402 completes, or certain portions of system call routines.

Figure 6C:
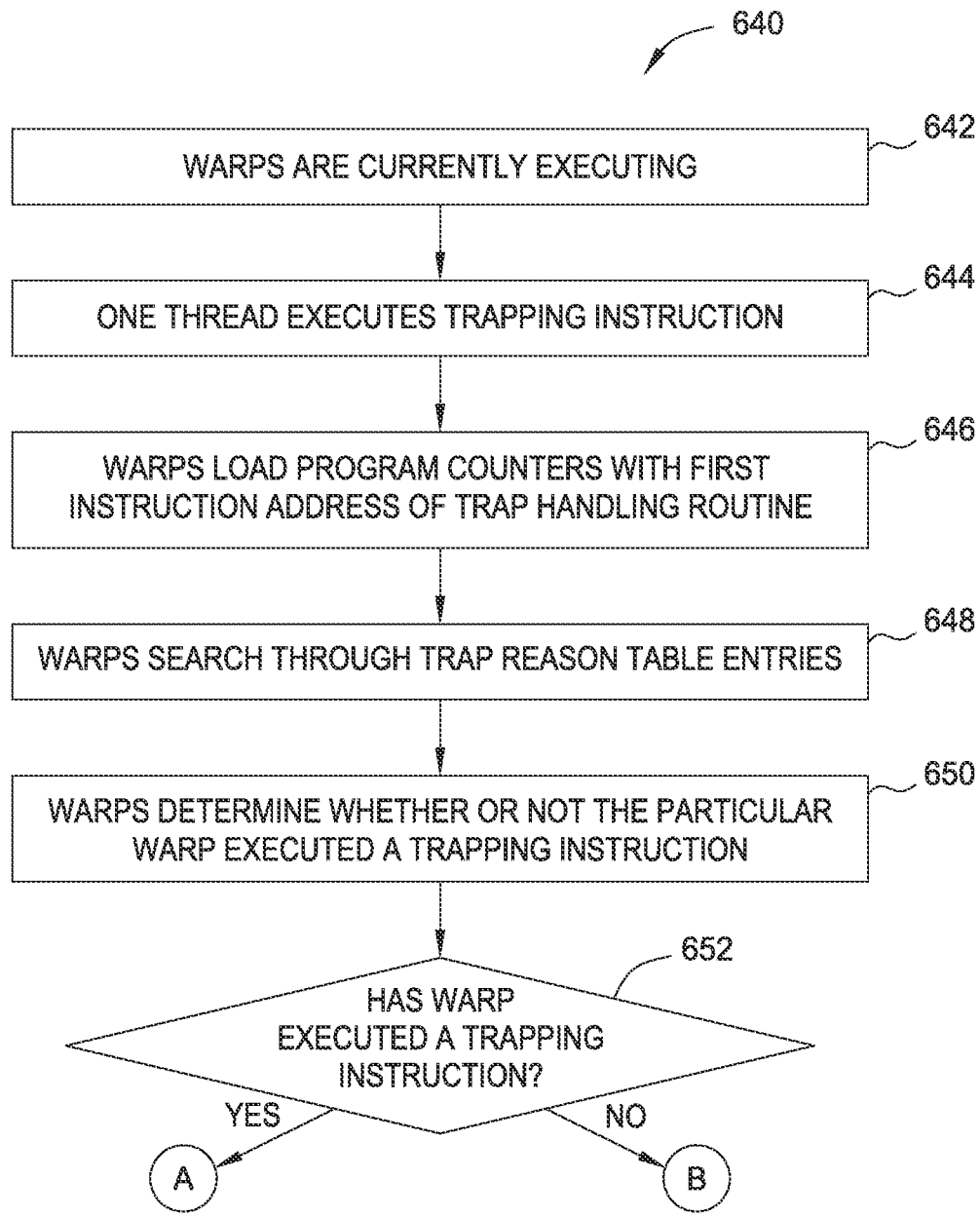
FIGS. 6C-6D set forth a flow diagram of method steps for performing a context save, according to one embodiment of the present invention.
Figure 6D:
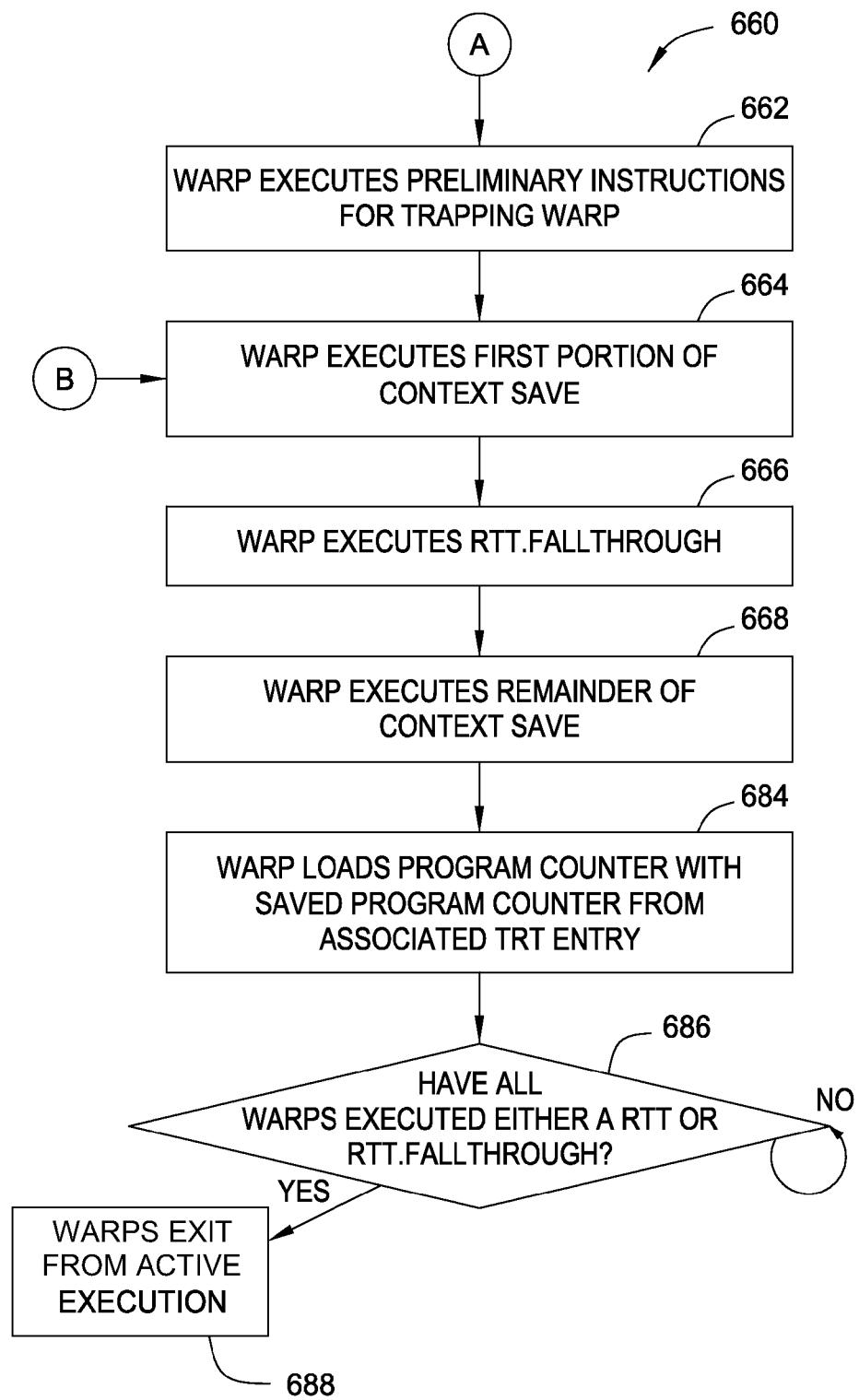

FIGS. 6C-6D set forth a flow diagram of method steps for performing a context save, according to one embodiment of the present invention. Although the method steps are described in conjunction with the systems of FIGS. 1-5, persons skilled in the art will understand that any system configured to perform the method steps, in any order, is within the scope of the invention.

As shown, a method 640 begins at step 642, where warps 404 are currently executing. At step 644, one warp 404 executes a trapping instruction, causing a trap. At step 646, warps 404 execute instructions causing each warp 404 to load the program counter associated with each warp 404 with the first instruction address of the trap handling routine 506 (e.g., preliminary instructions 508). Thus, the trap handling process begins. At step 648, warps 404 execute instructions causing a search through TRT entries 602. At step 650, warps 404 execute instructions causing a determination as to which particular warp 404 executed a trapping instruction based on the search conducted in step 648. At step 652, each warp 404 executes instructions causing a determination of the trap reason 604 based on the TRT entry 602 associated with the warp 404. If a warp 404 has not caused a trap to occur, then the method continues to step 664 of method 660, as described below. If a warp 404 has caused trap to occur, then the method continues to step 662 of method 660.

At step 662, the warp 404 executes preliminary instructions 508 for trapping warp 404. At step 664, the warp 404 executes a first portion of instructions causing a context switch for the warp 404. In some embodiments, the warp 404 saves context that is not directly accessible to the registers, including, without limitation, the barrier status, the call/return stack pointer, and the call/return stack metadata. At step 666, in one embodiment, the warp 404 may execute an RTT.FALLTHROUGH instruction. At step 668, the warp 404 executes the remainder of the instructions causing a context switch. At step 684, the warp 404 executes a user save program to save additional user-defined context by loading the program counter register with the value stored in the program counter 606 in the appropriate TRT entry 602. Prior to completing the user save routine, the warp 404 informs other executing CTAs that the context for the current warp 404 is saved to memory and the warp 404 can be restored when the conditions causing the trap have been resolved. In some embodiments, the warp 404 may also execute additional instructions to complete the trap handling routine 506. At step 686, the warp 404 determines whether all warps 404 in CTA 402 that were executing the trap handling routine 506 have executed either a RTT instruction or a RTT.FALLTHROUGH instruction. If not all warps 404 have executed either a RTT instruction or a RTT.FALLTHROUGH instruction, then the method waits at step 686. If, at step 686, all warps 404 have executed either a RTT instruction or a RTT.FALLTHROUGH instruction, then the method 660 proceeds to step 688, where the warps 404 in CTA 402 exit from active execution in the SM 310(0).

In one embodiment of the invention, an RTT.FALLTHROUGH instruction may be executed in order to address a potential performance concern that arises when fewer than all of the CTAs within an SM 310 include a trapping instruction. When a trapping instruction is executed, the progress of all CTAs 402 within the SM 310 may be interrupted in order to allow proper handling of the trapping instruction. Furthermore, this interruption may continue until the execution of trap handling routine 506 associated with the trapping warps 404 is complete. Thus, if non-trapping CTAs are allowed to exit the trap handler, before the execution of trap handling routine 506 is completed, then non-trapping CTAs resume execution more quickly.

In one embodiment, a coalescing window may delay trap handling for a predetermined number (Z) of cycles so that multiple traps from the trapping warp can be encountered and handled with a single context switch. In another embodiment, the number Z may be configurable with a privileged register setting.

Figure 7:
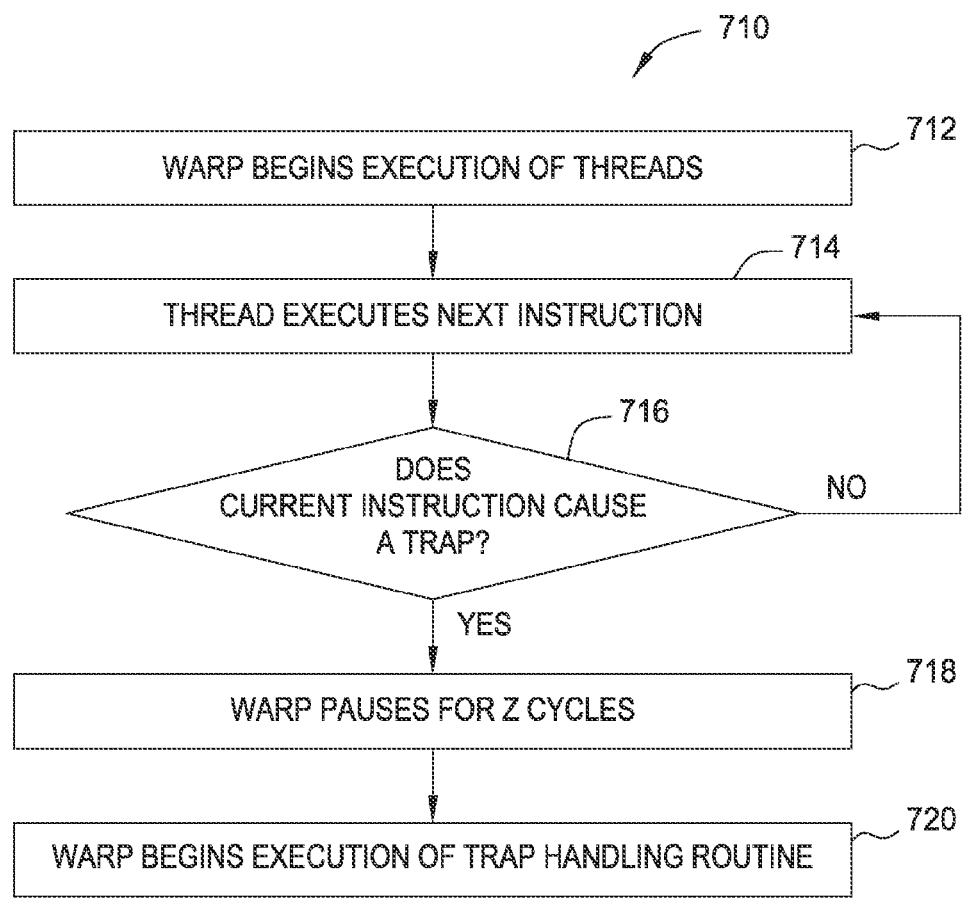
FIG. 7 sets forth a flow diagram of method steps depicting a process for handling a trap with a coalescing window, according to one embodiment of the present invention.

FIG. 7 sets forth a flow diagram of method steps depicting a process for handling a trap with a coalescing window, according to one embodiment of the present invention. Although the method steps are described in conjunction with the systems of FIGS. 1-5, persons skilled in the art will understand that any system configured to perform the method steps, in any order, is within the scope of the invention.

As shown, a method 710 begins at step 712, where a warp 404 begins executing a set of associated threads. At step 714, each thread in the warp 404 executes a next instruction. At step 716, the warp 404 determines whether the current instruction causes a trap. If the current instruction does not cause a trap, then the method returns to step 714, where each thread in the warp 404 executes the next instruction. If, at step 716, the current instruction does cause a trap, then the method 710 proceeds to step 718, where the warp 404 pauses execution for Z cycles. This delay of Z cycles for handling the trap allows other traps to occur (e.g., from other threads running in the trapping warp 404(0) or other warps 404(1)-404(m−1) in the CTA 402). Such additional traps are coalesced with the first trap and handled with a single context switch of the warps 404 in the CTA 402. At step 720, the warp 404 begins execution of trap handling routine 506, as described above in conjunction with FIGS. 6C-6D.

Figure 8A:
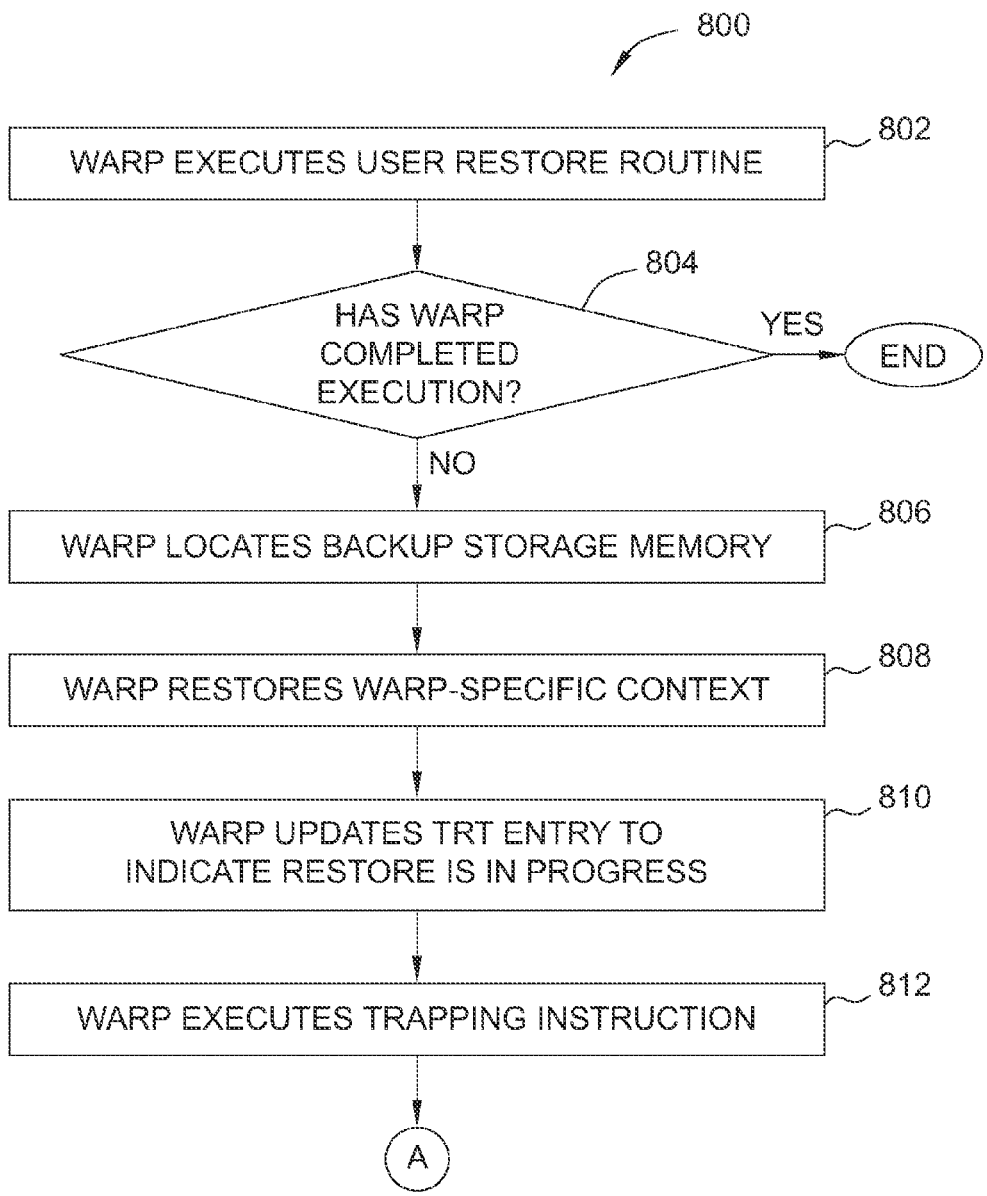
FIGS. 8A-8B set forth a flow diagram of method steps for performing a context restore operation, according to one embodiment of the present invention.
Figure 8B:
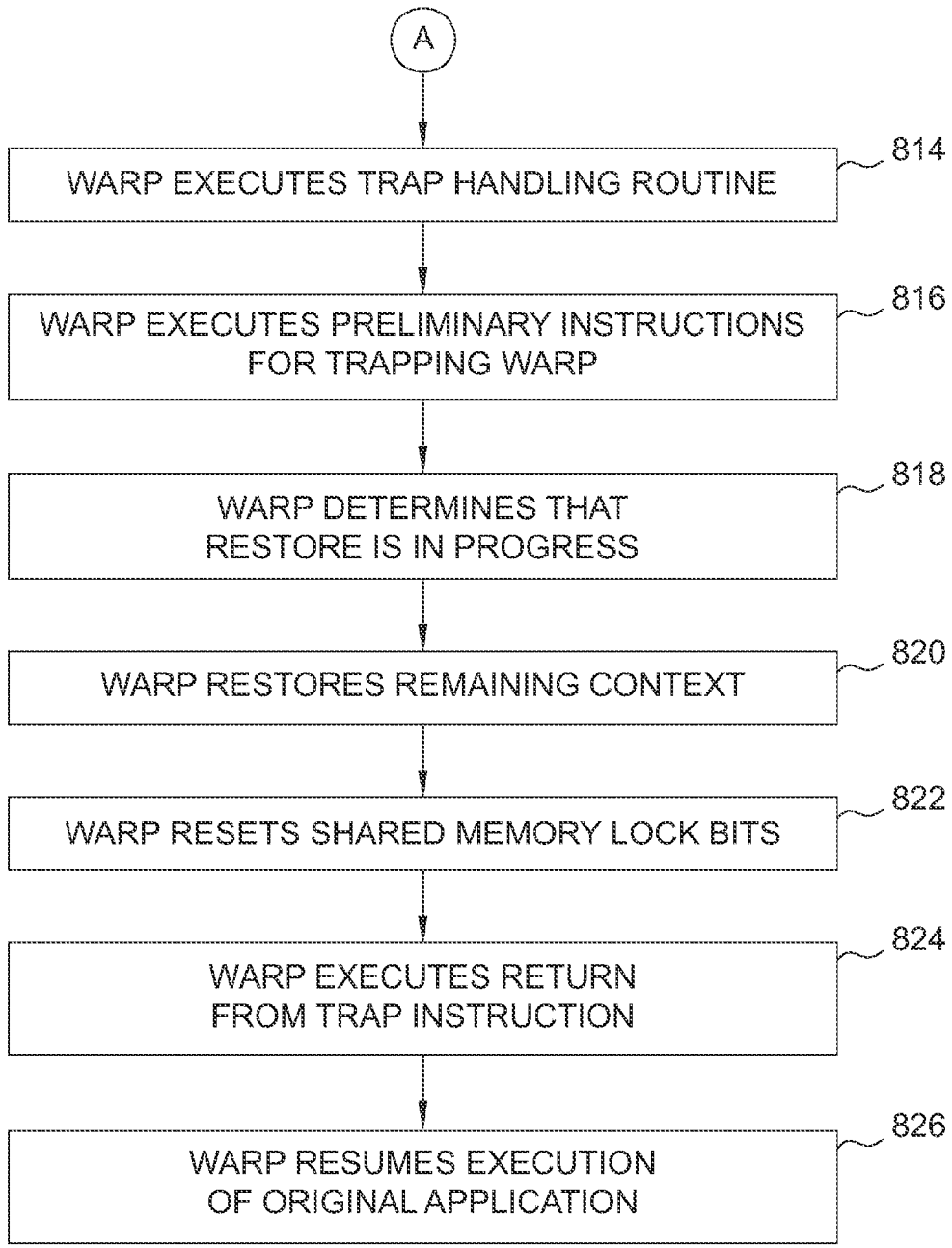

FIGS. 8A-8B set forth a flow diagram of method steps for performing a context restore operation, according to one embodiment of the present invention. Although the method steps are described in conjunction with the systems of FIGS. 1-5, persons skilled in the art will understand that any system configured to perform the method steps, in any order, is within the scope of the invention.

As shown, a method 800 begins at step 802, where a warp 404 executes a user restore routine. At step 804, the warp 404 determines whether the warp 404 completed execution prior to the context save. If the warp 404 completed execution prior to the context save, then the method 800 terminates.

If, however, the warp 404 has not completed execution prior to the context save, then the method 800 proceeds to step 806, where the warp 404 locates the backup storage memory that includes the previously stored context. At step 808, the warp 404 restores the warp-specific context from the backup storage memory. At step, 810, the warp 404 updates a warp-specific entry in the TRT to include an indication that the warp 404 is being restored and a pointer to the location of the backup storage memory. At step 812, the warp 404 executes a trapping instruction to pass control to a trap handling routine 506.

At step 814, the warp 404 executes the trap handling routine 506. At step 816, in some embodiments, the warp 404 may execute preliminary instructions 508 upon entering the trap handling routine 506. At step 818, the warp 404 determines that the warp 404 entered the trap handling routine because a context restore operation is in progress. At step 820, the warp 404 restores the context from the backup storage memory to the appropriate memory and register locations. In some embodiments, the warp 404 also restores context that is not directly accessible to the registers, including, without limitation, barrier status, CRS pointer, and CRS metadata. At step 822, in some embodiments, the warp 404 resets shared memory lock bits associated with the warp 404. At step 824, the warp 404 executes a return from trap (RTT) instruction, causing the warp 404 to exit the trap handling routine 506.

At step 826, the warp 404 that originally executed the trapping instruction at step 644 in FIG. 6C returns from the trap handling routing. The trapping thread resumes execution at the point where the original application program was executing prior to the context save. The backup storage memory includes the stored value of the program counter at the point where the original application program was interrupted by the trapping instruction referred to in step 644 in FIG. 6C, described above. This stored value is restored to the active program counter, and execution of the original application program resumes. In some embodiments, other threads 404 that executed a trapping instruction during a coalescing window, as described in conjunction with FIG. 7, may similarly restore the program counter to the value stored in the backup storage memory for the respective warp 404. Warps 404 that did not execute a trapping instruction may resume execution at the point where the warps 404 were executing just prior to the context save of the CTA 402. The method 800 then terminates.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for restoring thread groups in a cooperative thread array (CTA) within a processing core, the method comprising:
   launching a plurality of thread groups within the processing core to execute a context restore routine;
   for a first thread group included in a plurality of thread groups, executing the context restore routine to restore from a memory a first portion of a context associated with the first thread group;
   determining whether the first thread group completed an assigned function prior to executing the context restore routine; and
   if the first thread group completed the assigned function prior to executing the context restore routine, then exiting the context restore routine, or
   if the first thread group did not complete the assigned function prior to executing the context restore routine, then executing one or more operations associated with a trap handler routine.

2. The method of claim 1, further comprising:
   locating a first entry associated with the first thread group in a data structure that includes trap information for each thread group included in the plurality of thread groups; and
   updating an identifier within the first entry to identify the current operation as a context restore operation.

3. The method of claim 2, wherein executing one or more operations associated with a trap handler routine comprises:
   determining that a context restore operation is in process, and restoring from the memory a second portion of the context associated with the first thread group.

4. The method of claim 3, wherein determining that a context restore operation is in process comprises:
   retrieving the entry associated with the first thread group from the data structure; and determining that the entry associated with the first thread group identifies the current operation as a context restore operation.

5. The method of claim 3, wherein restoring the second portion of the context associated with the first thread group comprises;
copying data associated with state information associated with the processing core from the memory to a register, wherein the operating status is not directly accessible to the processing core; and
executing an instruction to transfer the contents of the register to a hardware unit configured to maintain the operating status.

6. The method of claim 5, wherein the state information includes at least one of a state of one or more execution barriers, a pointer to a call/return stack, and metadata associated with the call/return stack.

7. The method of claim 3, wherein the second portion of the context includes context that is common to at least two thread groups included in a plurality of thread groups.

8. The method of claim 7, wherein the first portion of the context includes context specific to the first thread group.

9. The method of claim 1, further comprising clearing a plurality of memory lock indicators to remove permission from a thread group to atomically access a resource that is shared among at least two of the thread groups within the plurality of thread groups.

10. The method of claim 1, further comprising:
executing an instruction to exit the trap handler routine; and
causing a thread program to resume executing where the thread program was executing prior to the context restore operation.

11. A non-transitory computer readable storage medium comprising instructions that cause a processor to restore thread groups in a cooperative thread array (CTA) within a processing core, comprising the steps of:
launching each thread group included in a plurality of thread groups within the processing core to execute a context restore routine;
for thread group included in a plurality of thread groups, executing the context restore routine to restore from a memory a first portion of a context associated with the thread group;
for a first thread group included in the plurality of thread groups, determining that the first thread group did not complete an assigned function prior to executing the context restore routine; and
in response, executing one or more operations associated with a trap handler routine.

12. The non-transitory computer readable storage medium of claim 11, further comprising the steps of:
locating a first entry associated with the first thread group in a data structure that includes trap information for each thread group included in the plurality of thread groups; and
updating an identifier within the first entry to identify the current operation as a context restore operation.

13. The non-transitory computer readable storage medium of claim 12, wherein executing one or more operations associated with a trap handler routine comprises:
determining that a context restore operation is in process, and restoring from the memory a second portion of the context associated with the first thread group.

14. The non-transitory computer readable storage medium of claim 13, wherein determining that a context restore operation is in process comprises:
retrieving the entry associated with the first thread group from the data structure; and
determining that the entry associated with the first thread group identifies the current operation as a context restore operation.

15. The non-transitory computer readable storage medium of claim 13, wherein restoring the second portion of the context associated with the first thread group comprises;
copying data associated with state information associated with the processing core from the memory to a register, wherein the operating status is not directly accessible to the processing core; and
executing an instruction to transfer the contents of the register to a hardware unit configured to maintain the operating status.

16. The non-transitory computer readable storage medium of claim 15, wherein the state information includes at least one of a state of one or more execution barriers, a pointer to a call/return stack, and metadata associated with the call/return stack.

17. The non-transitory computer readable storage medium of claim 13, wherein the second portion of the context includes context that is common to at least two thread groups included in a plurality of thread groups.

18. The non-transitory computer readable storage medium of claim 17, wherein the first portion of the context includes context specific to the first thread group.

19. The non-transitory computer readable storage medium of claim 11, further comprising the step of clearing a plurality of memory lock indicators to remove permission from a thread group to atomically access a resource that is shared among at least two of the thread groups within the plurality of thread groups.

20. The non-transitory computer readable storage medium of claim 11, further comprising the steps of:
executing an instruction to exit the trap handler routine; and
causing a thread program to resume executing where the thread program was executing prior to the context restore operation.

21. A computer system comprising:
a memory that stores instructions and data related to a trap handling routine;
a processor that executes the instructions to restore thread groups in a cooperative thread array (CTA) within a processing core by performing the steps of:
launching each thread group included in a plurality of thread groups within the processing core to execute a context restore routine;
for each thread group included in a plurality of thread groups, executing the context restore routine to restore from a memory a first portion of a context associated with the thread group;
for each thread group included in the plurality of thread groups, determining whether the thread group completed an assigned function prior to executing the context restore routine; and
if the thread group completed an assigned function prior to executing the context restore routine, then exiting the context restore routine, or
if the thread group did not complete the assigned function prior to executing the context restore routine, then executing one or more operations associated with a trap handler routine.

* * * * *

UNITED STATES PATENT AND TRADEMARK OFFICE
CERTIFICATE OF CORRECTION

| | | |
|---|---|---|
| PATENT NO. | : 9,448,837 B2 | Page 1 of 1 |
| APPLICATION NO. | : 13/863286 | |
| DATED | : September 20, 2016 | |
| INVENTOR(S) | : Gerald F. Luiz et al. | |

It is certified that error appears in the above-identified patent and that said Letters Patent is hereby corrected as shown below:

In the Claims

Column 19, Claim 11, Line 41, please insert --each-- after for;

Column 20, Claim 15, Line 8, please delete ";" and insert --:--.

Signed and Sealed this
Seventeenth Day of January, 2017

Michelle K. Lee
*Director of the United States Patent and Trademark Office*